US008183720B2

(12) United States Patent
Yan

(10) Patent No.: US 8,183,720 B2
(45) Date of Patent: May 22, 2012

(54) MAGNETIC CIRCUIT SYSTEM

(75) Inventor: Xu-Dong Yan, Shenzhen (CN)

(73) Assignees: AAC Acoustic Technologies (ShenZhen) Co. Ltd., Shenzhen (CN); American Audio Components Inc., La Verne, CA (US)

( * ) Notice: Subject to any disclaimer, the term of this patent is extended or adjusted under 35 U.S.C. 154(b) by 369 days.

(21) Appl. No.: 12/697,247

(22) Filed: Jan. 30, 2010

(65) Prior Publication Data

US 2010/0301683 A1 Dec. 2, 2010

(30) Foreign Application Priority Data

May 27, 2009 (CN) ...................... 2009 2 0132248 U

(51) Int. Cl.
*H02K 41/035* (2006.01)

(52) U.S. Cl. ......... 310/12.16; 310/13; 310/36; 335/222; 381/396

(58) Field of Classification Search ............... 310/12.16, 310/12.21, 12.24, 13–15, 27, 36, 37; 335/222, 335/281, 297; 381/396, 414, 420
See application file for complete search history.

(56) References Cited

U.S. PATENT DOCUMENTS

| | | | | | |
|---|---|---|---|---|---|
| 4,386,332 | A | * | 5/1983 | Saito | 335/231 |
| 4,661,973 | A | * | 4/1987 | Takahashi | 379/194 |
| 5,434,458 | A | * | 7/1995 | Stuart et al. | 310/13 |
| 5,751,828 | A | * | 5/1998 | Ueda et al. | 381/412 |
| 6,420,467 | B1 | * | 7/2002 | Ohtsuka et al. | 524/314 |
| 7,685,695 | B2 | * | 3/2010 | Kishi | 29/594 |
| 2007/0132321 | A1 | * | 6/2007 | Park et al. | 310/15 |

* cited by examiner

*Primary Examiner* — Quyen Leung
*Assistant Examiner* — Naishadh Desai

(57) ABSTRACT

A magnetic circuit system includes a T-shaped yoke, a magnet, and a top plate. The top plate has a center hole, an internal end around the center hole thereof, and two projecting elements provided separately on upper surface and lower surface of the internal end, which improves non-linear distortion of a transducer using the magnetic circuit system.

7 Claims, 2 Drawing Sheets

MAGNETIC CIRCUIT SYSTEM

BACKGROUND OF THE INVENTION

1. Field of the Invention

The present invention generally relates to structures of magnetic circuit systems, more particularly to an external-magnet-type magnetic circuit system.

2. Related Art of the Invention

Generally, transducers, such as speakers, need a magnetic circuit system for generating electro-magnetic force to drive a coil to move.

Typically, the magnetic circuit system includes a T-shaped yoke having a center pole projecting from a center part of a plate, a ring-shaped magnet positioned on the yoke, and a ring-shaped top plate attached to the magnet. A magnetic gap is formed between the center pole and an inner surface of the top plate. If a coil is suspended in the magnetic gap, when electrified, the coil will be given a magnetizing force F, and the force F is determined by the product of magnetic flux (B), displacement of the coil (L), and current applied on the coil (I). Production of B and L is called magnetizing force factor. If the magnetizing force factor is not even during the vibration of the coil, the magnetizing force will lead to non-linear distortion.

So, it is necessary to provide an improved magnetic circuit system for solving the problem mentioned above.

SUMMARY OF THE INVENTION

In one embodiment of the present invention, a magnetic circuit system includes a yoke having a lower plate and a center pole projecting from a central part of the lower plate, a magnet having a through hole, and a top plate attached to the magnet. A magnetic gap is defined between an inner surface of the top plate and an outer surface of the centre pole of the yoke. The top plate has a portion close to the central pole of the yoke having a thickness greater than that of the remaining portion.

Other features and advantages of the present invention will become more apparent to those skilled in the art upon examination of the following drawings and detailed description of the exemplary embodiment.

DETAILED DESCRIPTION OF THE PREFERRED EMBODIMENT

Reference will now be made to describe an exemplary embodiment of the present invention in detail.

Figure 1:
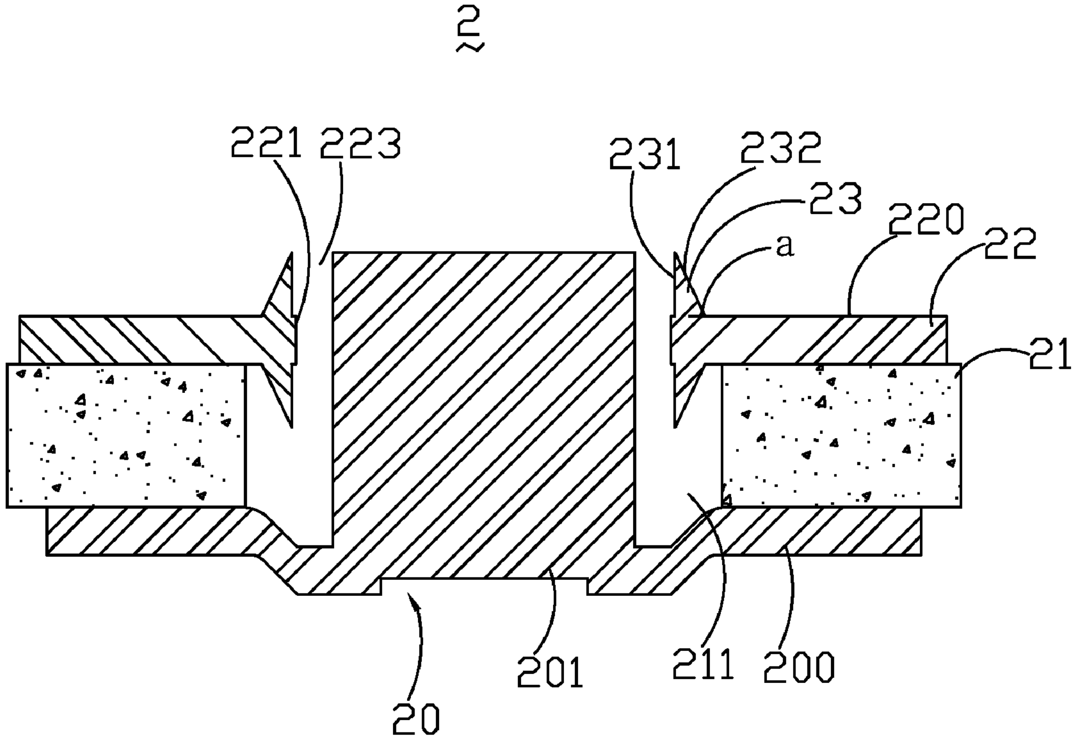
FIG. 1 depicts a cross-sectional view of a magnetic circuit system in accordance with one embodiment of the present invention.

Referring to FIG. 1, a magnetic circuit system 2 of one exemplary embodiment of the present invention includes a yoke 20, a magnet 21 positioned on the yoke 20, and a top plate 22 attached to a top surface of the magnet 21.

The yoke 20 defines a lower plate 200 and a central pole 201 protruding uprightly from a central portion of the lower plate 200. The magnet 21 defines a through hole 211 in a central portion thereof. When assembled, the magnet 21 is located on the lower plate 200 and the central pole 201 passes through the through hole 211 of the magnet 21. The top plate 22 has a central aperture surrounding by an inner surface 221. When assembled, the top plate 22 is located on the magnet 21 and the central pole 201 of the yoke passes through the central aperture. A magnetic gap 223 is formed between an outer surface of the central pole 201 of the yoke 20 and the inner surface 221 of the top plate 22. Along a direction parallel to the central pole 201, the top plate 22 has a portion close to the outer surface of the central pole 201 of the yoke having a thickness greater than that of the remaining portion. For example, the top plate 22 defines a projecting element 23 extending perpendicularly from a portion close to the inner surface 221. A cross section of the projecting element 23 is a triangle having a first side 231 parallel to the central pole 201 of the yoke 20 and a second side 232 connecting the first side and a top surface 220 of the top plate 22. An angle $\alpha$ is formed between the second side 232 and the top surface 220. The angle $\alpha$ is between 20~70 degrees.

Figure 2:
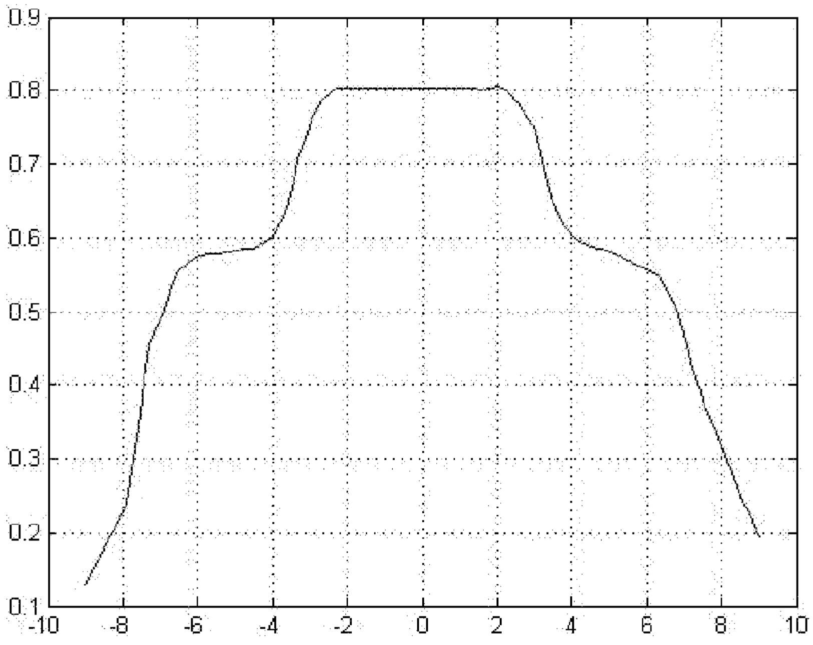
FIG. 2 illustrates an illustration of the distribution of magnetic flux (B) of the magnetic circuit system.
Figure 3:
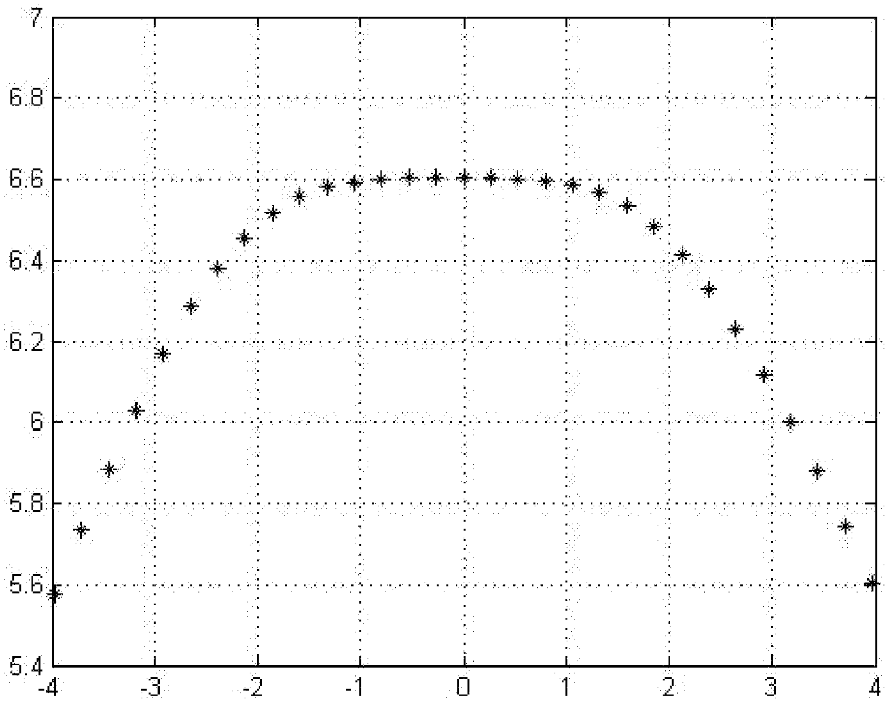
FIG. 3 illustrates an illustration of the distribution of BL of the magnetic circuit system.

While the magnetic circuit system 2 is applied in a transducer, such as a speaker, a voice coil (not shown) is partially received in the magnetic gap 223. When electrified, the voice coil is forced to move in the magnetic gap 223 along a direction parallel to the central pole 201 by virtue of the electro-magnetic force. The magnetic field is provided by the magnetic circuit system 2. Refer to FIG. 2 for the distribution of the magnetic intensity in the magnetic gap 223. The horizontal axis of FIG. 2 is the position of the voice coil, and the perpendicular axis is the magnetic flux of the magnetic gap 223. It is obvious that a smooth and even line is formed at −2~2 segment. Referring to FIG. 3, as the magnetic flux at the −2~2 segment is substantially the same, the magnetic force, i.e., the Lorentz force, applied on the coil is substantially the same at the −2~2 segment, which effectively improves the non-linear distortion of the speaker.

The magnetic circuit system disclosed above can be applied on speakers, receivers, linear vibrators, etc.

While the present invention has been described with reference to a specific embodiment, the description of the invention is illustrative and is not to be construed as limiting the invention. Various of modifications to the present invention can be made to the preferred embodiment by those skilled in the art without departing from the true spirit and scope of the invention as defined by the appended claims.

What is claimed is:

1. A magnetic circuit system, comprising:

a yoke having a lower plate and a center pole projecting from a central part of the lower plate;

a magnet having a through hole, and coupled to the lower plate of the magnet with the through hole around the centre pole;

a top plate attached to the magnet, and having a centre aperture around the central pole of the yoke;

a magnetic gap defined between an inner surface of the top plate and an outer surface of the centre pole of the yoke; wherein the top plate has a portion close to the central pole of the yoke having a thickness greater than that of the remaining portion.

2. The magnetic circuit system as describe in claim 1, wherein the top plate defines a projecting element uprightly protruding from a portion close to the central pole of the yoke.

3. The magnetic circuit system as describe in claim 2, wherein a cross section of the projecting element is a triangle.

4. The magnetic circuit system as describe in claim 3, wherein the triangle has a first side parallel to the central pole of the yoke and a second side connecting the first side to a top surface of the top plate, the second side forming an angle relative to the top surface.

5. The magnetic circuit system as describe in claim 4, wherein the angle is between 20~70 degrees.

6. The magnetic circuit system as describe in claim 2, wherein the portion where the projecting element protrudes from is farther from the central pole than the most inner side of the top plate.

7. A transducer having a magnetic circuit system, the magnetic circuit system comprising:

a yoke having a lower plate and a center pole projecting from a central part of the lower plate;

a magnet having a through hole, and coupled to the lower plate of the magnet with the through hole around the centre pole;

a top plate attached to the magnet, and having a centre aperture around the central pole of the yoke;

a magnetic gap defined between an inner surface of the top plate and an outer surface of the centre pole of the yoke; wherein the top plate has a portion close to the central pole of the yoke having a thickness greater than that of the remaining portion.

* * * * *